US010684908B2

(12) United States Patent
Poledna et al.

(10) Patent No.: US 10,684,908 B2
(45) Date of Patent: Jun. 16, 2020

(54) METHOD FOR FAULT DETECTION IN AN OPERATING SYSTEM

(71) Applicant: TTTech Computertechnik Aktiengesellschaft, Vienna (AT)

(72) Inventors: Stefan Poledna, Klosterneuburg (AT); Andreas Wolf, Seebenstein (AT); Hermann Kopetz, Baden (AT); Martin Hoefler, Kritzendorf (AT)

(73) Assignee: TTTECH AUTO AG, Vienna (AT)

( * ) Notice: Subject to any disclaimer, the term of this patent is extended or adjusted under 35 U.S.C. 154(b) by 226 days.

(21) Appl. No.: 15/951,715

(22) Filed: Apr. 12, 2018

(65) Prior Publication Data

US 2018/0300194 A1 Oct. 18, 2018

(30) Foreign Application Priority Data

Apr. 13, 2017 (EP) .................... 17166581

(51) Int. Cl.
*G06F 11/00* (2006.01)
*G06F 11/07* (2006.01)
*G06F 11/10* (2006.01)

(52) U.S. Cl.
CPC .......... *G06F 11/079* (2013.01); *G06F 11/073* (2013.01); *G06F 11/0757* (2013.01); *G06F 11/0793* (2013.01); *G06F 11/1004* (2013.01)

(58) Field of Classification Search
CPC .. G06F 11/079; G06F 11/073; G06F 11/0757; G06F 11/0793; G06F 11/1004
See application file for complete search history.

(56) References Cited

U.S. PATENT DOCUMENTS

| 5,598,530 | A | 1/1997 | Nagae | |
|---|---|---|---|---|
| 2003/0188231 | A1 | 10/2003 | Cronce | |
| 2004/0030949 | A1* | 2/2004 | Kopetz | G06F 11/0757 714/4.1 |
| 2010/0125915 | A1* | 5/2010 | Hall | G06F 21/85 726/26 |
| 2013/0124871 | A1* | 5/2013 | Park | G06F 21/645 713/187 |

OTHER PUBLICATIONS

European Search Report issued in Application No. 17166581.3, dated Sep. 15, 2017 (1 page).
Kopetz, H., "Real-Time Systems", Design Principles for Distributed Embedded Applications. Springer Verlag. 2011.
Palix et al., "Faults in Linux 2.6", ACM Transactions on Computer Systems, Association for Computing Machinery, 2014, 32 (2): 4:1-4:41.

* cited by examiner

*Primary Examiner* — Katherine Lin
(74) *Attorney, Agent, or Firm* — Eversheds Sutherland (US) LLP

(57) ABSTRACT

The invention relates to a method for detecting faults that occur or are present in an operating system of a computer, wherein an in particular independent audit task (106) is carried out during the run time before a starting time (102, 112) of the requested application task (107), wherein the control registers define the properties of the run time environment of the requested application task (107) and have reading access to the contents and validate these contents. Furthermore, the invention relates to a computer, on which such a method is carried out.

9 Claims, 1 Drawing Sheet

METHOD FOR FAULT DETECTION IN AN OPERATING SYSTEM

CROSS-REFERENCE TO RELATED APPLICATIONS

Figure 1A:
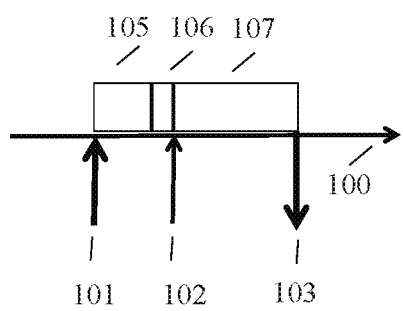

This application claims priority to and the benefit of EP application No. 17166581.3, filed Apr. 13, 2017, which is incorporated by reference herein in its entirety.

The invention relates to a method for detecting faults that are present or occur in an operating system of a computer.

In addition, the invention relates to a computer having an operating system.

Finally, the invention relates to a computer system, in particular a distributed, time-controlled, real-time computer system, comprising node computers, wherein one or more node computers are embodied as computers according to the invention.

The invention is in the field of computer technology. It relates to a method, which makes it possible to check on the performance of an operating system during the run time and to detect any faulty results. These faulty results of the operating system may be caused by existing design errors in the software of the operating system or by transient hardware faults during the run time of the operating system.

The developments of sensor technology and computer technology enable largely autonomous control of technical objects such as machines, which operate autonomously, or vehicles, which autonomously aim for a destination. In these real-time computer applications, rapid detection of faults/errors in the computer system is required, in particular in order to be able to rapidly bring the technical object into a safe condition after a fault has occurred. In many technical objects, immediate stopping of the control process after the detection of a fault (emergency off) is a measure for bringing the system into a secure state.

Complex operating systems such as LINUX, for example, are used in many real-time computer applications. Many of these complex operating systems contain undetected software errors. It is thus ascertained in [2] that 855 errors have been identified in the very popular LINUX operating system in the version LINUX 3.0. With the method proposed as part of the present invention, the consequences of some of these errors can be ameliorated.

In the following discussion, we refer to the totality of all programs containing the operating system as operating system software.

We refer to the totality of all programs containing an application system as application software.

The term software is understood to include the totality of the operating system software and the application software.

We refer to the execution of a program (i.e., a software process) on a machine as a task.

A task of the operating system software and/or the operating system is also referred to as an operating system task. A task of the application software and/or of the application system is also referred to as an application task.

We model the behavior of a task (independently of whether it is an operating system task or an application task) by a finite state automaton and refer to a task which calculates a new result and a new state from given input data and an old state as a calculation task. We refer to a task that checks a result of a calculation task for accuracy as an audit task.

It corresponds to the state of the art that control systems (i.e., systems for real-time control and/or regulation of a controlled object) run periodically [1, p. 7]. The controlled object is observed at periodic observation times (sampling points). The detected data form the basis for the fastest possible calculation of new target values for actuators, which influence the behavior of the controlled object.

We refer to the periodic recurring execution of a sequence of calculations, possibly distributed, which must be carried out after each observation, as a frame.

Ore or more real-time transactions (RT transactions, see [1, p. 24]) may take place in a frame.

The sequence of operating system tasks and application tasks (i.e., software processes), which are processed within an RT transaction, is defined in one or more data flow paths (DFP).

Two time parameters are associated with each frame:

The execution time (also known as the response time) indicates the interval of time between the sampling point and the output of the results of the frame to actuators of the controlled object. The shorter the execution time of a frame, the better is the quality of the control system.

The frame interval indicates the distance in time between two successive frames.

The number of frames processed per second is often expressed in Hertz (Hz).

The reason for the occurrence of a fault in a frame may be an aging fault (physical fault) in the computer hardware or an existing design error in the computer hardware or software.

A physical fault occurs when a module, which was fully functional at the start of its lifetime, fails because of aging processes in the hardware or physical environmental influences (for example, cosmic radiation). The error rate for permanent aging faults (physical faults) in state-of-the-art chips is <100 FIT.

The error rate of transient hardware faults is much greater than the error rate of permanent hardware faults [1, p. 155]. In many cases, the operational effects of a transient hardware fault cannot be differentiated from a Heisenbug [1, p. 138] in the software.

A major cause of software design errors is the complexity of the software.

Measures leading to a reduction in the probability of occurrence of an undiscovered design error in the software include a systematic design process, verification and validation and in particular extensive testing of the software both off-line and on-line.

In an on-line test, interim results of a task, in particular a calculation task (of the operating system software or the application software) is validated, i.e., checked for validity during operation of the computer system and/or computer. In an on-line test the effects of design errors in the software (e.g., undetected Heisenbugs) and transient hardware faults can be detected.

One object of the invention is to detect faulty results of operating system tasks, namely calculation tasks of the operating system during the run time. These faulty results may be caused by design errors in the operating system software or by physical faults (permanent and transient hardware defects) during the run time of the operating system.

This object is achieved according to the invention by the fact that, during the run time before the starting point of a requested application task, an audit task, in particular an independent audit task, which is carried out, has reading access to the contents of the control register of the computer, which are set by a calculation task of the operating system and which define the properties of the run-time environment of the requested application task and which validate these contents.

According to the invention, an audit task, in particular an independent audit task, is carried out, checking the results supplied by the operating system before starting to carry out an application task.

For example, two tasks are independent of one another if they were developed and/or tested separately from one another.

The present invention is based on the fact that, in most cases, calculating a result is more complicated than checking a result. The probability of an error occurring during calculation of a result is therefore higher than the probability of an error occurring during the audit of a result.

For example, it is much simpler to check on whether a sequence of numbers has been sorted correctly than to sort a random sequence of numbers.

Advantageous embodiments of the method, computer and computer system according to the invention are described below:

the audit task, in particular independent audit task, may be a part of the operating system software; or the audit task, in particular the independent audit task, may be part of the application software;

it is possible to provide that in the event the validation discovers an error in a control register, an emergency operation action is initiated;

it is possible to provide that, in the event the validation detects a fault in a frame, the system waits for the next frame before initiating an emergency operation action;

the operating system is preferably a time-controlled operating system and/or an application system is, for example, a time-controlled application system; in a time-controlled operating system, it is preferably provided that the calculation task of the operating system and the audit task, in particular the independent audit task, are carried out before the starting time of the application task, which is known a priori.

Whether, after detecting a fault in a frame, the process waits for the following frame, or whether an emergency operation action is initiated immediately depends on the specific statement of problem. In the case of a controlled object in the form of an autonomous vehicle, the immediate start of the vehicle may be an emergency operation action.

According to the invention, it is thus proposed that the results of calculation tasks of an extensive operating system—such as LINUX, for example—should be validated by preferably independent audit tasks. These preferably independent audit tasks may be part of the operating system software or part of the application software, i.e., they may be tasks of the operating system software or tasks of the application software.

If, after occurrence of an application-specific event (for example, the arrival of a message or the occurrence of an interrupt) the operating system is prompted to perform a change of context to an application task requested by the event, then a calculation task of the operating system must calculate the contents of the control register of the computer, which define the properties of the run-time environment of the requested application task before the starting point of the application task.

The properties of the run-time environment of the requested application task determine at least the following properties:

which data ranges the application task is allowed to read, which data ranges the application task may describe, which data ranges of the application task may be read and/or written by other tasks active in the operating system, and how much time the application task may need for its calculations.

After the end of the calculation task of the operating system, an audit task validates the contents of the control register of the computer according to the invention.

To prevent an error in the audit task from leading to a change in the contents of the control register of the computer, the audit task is allowed to access the contents of the control register of the computer only by reading access.

In the case when validation has discovered an error, an application-dependent emergency operation action may be prompted immediately, e.g., shut down the plant.

In the case when validation has discovered a fault in a periodic frame, it is possible to wait for the next frame before prompting an emergency operation action.

The control registers of a computer are validated when at least the following conditions are met:

The data of the application task is protected from unauthorized access by other tasks.

The stipulated read/write rights to the data in the computer correspond to the specifications of the application task.

The addresses for input/output data correspond to the specifications of the application task.

The run-time specifications of the application software to be monitored by the operating system correspond to the specifications of the application task.

We refer to the duration of activities of the operating system, which are to be carried out as part of a task change before the starting time of an application task, as the administrative overhead [1, p. 245]. The administrative overhead of a task change is obtained from the sum of the duration of execution of the calculation task and the duration of execution of the audit task.

Figure 1B:
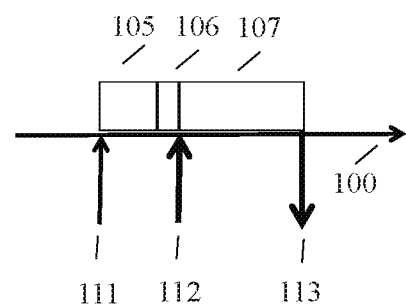

The invention is described below on the example of an embodiment illustrated in the drawings. In the drawings:

FIG. 1A shows the sequences of operating system tasks and application tasks in an event-controlled operating system of a computer, and FIG. 1B shows the sequences of operating system tasks and application tasks in a time-controlled operating system of a computer.

FIG. 1A shows the chronological sequence of a task change in an event-controlled operating system of a computer. The abscissa 100 shows a progressive time scale. For example, an event occurs at a point 101, which is not known a priori, in an event-controlled operating system, resulting in a task change. In the interval of time 105, the computer operating system calculates the new contents of the control registers of the computer. In the interval of time 106 the operating system validates the register contents. At point 102, the starting point of a required application task, the application task begins to perform calculations. The application task produces its results after the duration 107 of the application task. These results may be forwarded either to the actuators or to a downstream task in the frame. This takes place at point 103.

In FIG. 1B, the time sequence of a task change is represented in a time-controlled operating system. The abscissa 100 shows the time scale. In a time-controlled system, it is known a priori that a certain application task must begin with calculation at a starting point 112. Because of this a priori knowledge, the operating system can begin to calculate the new contents of the control register at a point 111.

After the end of calculation of the calculation task of the operating system with the duration 105, the operating system in the subsequent interval 106 validates the contents of the control registers with an audit task. This validation is concluded at point 112, which is the starting point known a priori for the new application task. After implementation time 107 of the application task, the application task produces its results. These results may be forwarded either to the actuators or to the next task in the frame. This takes place at point 113.

Point 111 is obtained from:

point 111=point 112−(duration 105 of calculation tasks of the operating system+duration 106 of the audit task)

In comparison with an event-controlled ET operating system, where the implementation time ET, which is important for the function of the application, is obtained as implementation time $ET$=(duration 105 of calculation task of the operating system+duration 106 of the audit task+duration 107 of the application task)

the duration of the implementation time (TT), which is important in a time-controlled (TT) operating system due to the a priori knowledge of the starting point in time of the application can be reduced to implementation time $TT$=(duration 107 of application task).

Due to the reduction in the implementation times of the tasks within a frame, the total implementation time of the frames is reduced in a time-controlled system, which results in an improvement in the quality of the control system.

LITERATURE CITED

[1] Kopetz, H. Real-Time Systems, Design Principles for Distributed Embedded Applications. Springer Verlag. 2011.
[2] Palix, N. et al., *Faults in LINUX* 2.6. ACM Transactions on Computer Systems. Vol 32. No 2. pp. 4.1-4.41. June 2014.

The invention claimed is:

1. A method for detecting faults present or occurring in an operating system of a computer, the method comprising:
   carrying out, during a run time before a starting time (102, 112) of a requested application task (107), an independent audit task having reading access to contents of control registers of the computer set by a calculation task (105) of the operating system,
   wherein the control registers are configured to determine properties of the run time of the requested application task (107),
   wherein the independent audit task is configured to validate the contents of the control register, and
   wherein the control registers are validated based on:
     application task data being protected from unauthorized access by other tasks,
     set read/write rights to data in the computer corresponding to a specification of the requested application task,
     address to input/output data corresponding to the specification of the requested application task, and
     run time specifications of application software monitored by the operating system corresponding to the specification of the requested application task.

2. The method according to claim 1, wherein the independent audit task (106) is part of software of the operating system.

3. The method according to claim 1, wherein the independent audit task (106) is a part of the application software.

4. The method according to claim 1, wherein an emergency operation action is initiated based on discovering fault in the control register.

5. The method according to claim 1, wherein based on discovering a fault in a frame, the operating system waits for a following frame before an emergency operation action is initiated.

6. The method according to claim 1, wherein the operating system is a time-controlled operating system and/or an application system is a time-controlled application system.

7. The method according to claim 6, wherein the calculation task (105) in a time-controlled operating system and the independent audit task (106) is carried out before the starting time (112) which is known a priori of the application task (107).

8. A computer configured to execute the method of claim 1.

9. The computer according to claim 8, further comprising a distributed time-controlled real-time computer system comprising node computers.

* * * * *